United States Patent [19]

Kiss

[11] 4,126,214
[45] Nov. 21, 1978

[54] POSITIVE ONE-WAY CLUTCH SYSTEM

[76] Inventor: Laszlo J. Kiss, 7044 Paige, Warren, Mich. 48091

[21] Appl. No.: 744,276

[22] Filed: Nov. 23, 1976

[51] Int. Cl.² ............................................. F16D 41/12
[52] U.S. Cl. ...................................... 192/36; 192/39; 192/46
[58] Field of Search ......................... 192/35, 36, 39, 46

[56] References Cited

U.S. PATENT DOCUMENTS

| | | | |
|---|---|---|---|
| 350,995 | 10/1886 | Rich | 192/46 X |
| 688,644 | 12/1901 | Houghtaling | 192/46 |
| 756,086 | 3/1904 | Weiler | 192/46 |
| 1,163,298 | 12/1915 | Winkler | 192/36 X |
| 1,396,343 | 11/1921 | Richardson | 192/46 |
| 2,308,926 | 1/1943 | Kreis | 192/46 |
| 3,432,015 | 3/1969 | Schwerdhofer | 192/36 X |

*Primary Examiner*—Allan D. Herrmann
*Attorney, Agent, or Firm*—Hauke and Patalidis

[57] ABSTRACT

A positive one-way clutch system providing positive non-frictional engagement between the driving and driven members in drive mode and complete dragless disengagement between the driven and driving members in free-wheeling or over-run mode. When in the driving mode, engagement between the driving and the driven members is effected by at least one and preferably a plurality of solid torque bars displaceable by an automatic positioning device between a retracted position, providing free-wheeling or over-run, to an engaged position with the end of the torque bars in positive abutting engagement with appropriate corresponding positive clutch teeth of the other member. Diverse arrangements of positioning devices are disclosed which may be automatically or controllably actuated.

13 Claims, 12 Drawing Figures

POSITIVE ONE-WAY CLUTCH SYSTEM

BACKGROUND OF THE INVENTION

The present invention relates to one-way clutch systems permitting, for example, a driven member to be positively driven by a driving member in one direction only, being capable of free-wheeling or over-run relative to the driving member when not in driven engagement with the driving member.

One-way clutches hereto known in the prior art are generally of the frictional drive type. They consist of a number of rollers or sprags disposed between an outer and an inner race, which are wedged between the surfaces of the inner and outer races for causing one or the other of the races to drive the other. When the driven race over-runs the driving race or when the driving race rotates in an opposite direction, the rollers or sprags are no longer caused to be wedged between the races, and the races are relatively free to rotate relative to each other. However, as the rollers or sprags are spring-loaded towards engagement, even during free-wheeling or over-running, a portion of the surface of the rollers or sprags contacts the surface of both the inner and outer races, thus causing friction resulting in drag, and therefore heat, and wear of the surfaces in contact. Frictional one-way clutches have therefore inherent limitations in torque transmittal capacities, which depend on the frictional effect of the surfaces in contact, in life, due to wear, and in the permissible relative speeds of rotation during free-wheeling and over-run.

Other types of one-way clutches, known as one-way ratchet clutches, consist of, in one version, spring-biased ratchet members pivotally attached to a clutch member at one end and provided at their other end with a hook-like portion engageable with the bearing face of a tooth-like ring fastened to the other clutch member. When the two clutch members tend to rotate in driving directions, the hook-like end of the ratchets engages the bearing surfaces of the teech thus causing the other clutch member to rotate in unison. When the relative rotation of the driving clutch member is in an opposite direction, that is during free-wheeling or over-run, the hook-like end of the ratchets is permitted by the spring to ride over each tooth of the toothed ring, as an escapement mechanism, permitting relative rotation of the members. Such ratchet-type one-way clutches are noisy, they are limited in their torque transmitting capacity, and they are subject to important wear in view of the ratchet ends continuously rubbing against the toothed member during over-running or free-wheeling.

Another type of ratchet one-way clutch consists generally of a pair of disk members provided with engageable faces having teeth, one side of which forms an inclined plane and the other side of which forms an abutment in the plane approximately parallel to the axis of rotation of the disk members. One disk member is constantly biased by spring pressure towards the other disk member. When the direction of rotation of the driving member causes the corresponding faces of the teeth in a plane parallel to the axis of rotation to engage, the driving member drives the driven member. When the driven member over-runs the driving member or the driving member runs oppositely the teeth inclined side engages and rides over each other, thus laterally displacing one of the disks against the spring pressure. Such one-way ratchet clutches are inherently subject to extreme wear, due to the spring pressure, and are subject, for the same reason, to considerable drag force during free-wheeling or over-running, and they generate considerable heat, and are limited in over-run or free wheeling speeds.

SUMMARY OF THE PRESENT INVENTION

The present invention remedies the disadvantages and shortcomings of the prior art by providing concentric spaced apart outer and inner race members, and a plurality of torque bar members disposed in the space between the inner and outer race members. Each of the torque bar members is supported by one of the race members as a result of one end of each of the torque bar members being held in pivotal and abutting engagement in an appropriate pocket formed in the surface of the race member. The other end of each torque bar member is automatically positively engageable with the positive clutch teech formed on the surface of the other race member. The torque bar members are pivotable in unison by an automatic positioning device from a retracted position whereby their free ends no longer engage the positive clutch teeth surfaces to a position where they are positively engaged therewith. In the first retracted position, the outer and inner races are free to rotate independently of each other. In the engaged position of the torque bar members, the inner and outer races are caused to rotate positively in unison, the driving torque being transmitted positively through the mass of the solid steel torque bar members acting in compression. The positioning member is arranged to automatically retract the torque bar members to the disengaged position as soon as the driven race over-runs the driving race, or the driving race starts to rotate oppositely. Alternatively, the positioning device may be selectively deactivated or "switched off" such that the torque bar elements remain retracted, thus permitting free relative rotation of the races in either direction. Furthermore, a variety of automatic "free-freewheel" or "free-over-run" arrangements are also provided, which fully automatically disengage the actuator element of the automatic positioning device from any contact with the outer race member during free-wheeling or over-running, with the result that there is no drag or noise present and there is no wear and no heat generated.

The positive coupling between the inner and outer races being effected through the intermediary of the torque bar members, when engaged, with the important thrust surfaces in constant positive engagement, without relying on friction to keep the surfaces in contact engagement, the result is that a substantial torque may be transmitted without slippage, and by means of clutch units according to the present invention of relatively small size and light weight as compared to conventional one-way clutch structures of the frictional and ratchet types.

The automatic positioning mechanism for the torque bar members, when actuated by the reverse relative rotation of the inner and outer races while passing from the free-wheeling mode to the engaged mode, causes rapid and positive engagement of the torque bar members in the course of a very small arc of reverse relative rotation, the magnitude of which is inversely proportional to the number of torque bar members, and of torque bar engaging clutch teeth surfaces, such that a positive one-way clutch according to the present invention may be designed with very little backlash when such requirement is important.

Consequently, as compared to prior art one-way clutches, the present invention presents the advantage of substantially no wear when engaged as well as when free-wheeling thus resulting in greatly increased life cycles, much cooler running, no limitation in the relative speed of rotation of the driving and driven elements during free-wheeling or over-run, much higher driving torque without any risk of slippage, and much smaller size for a given capacity.

BRIEF DESCRIPTION OF THE DRAWING

The many objects and advantages of the present invention will become apparent to those skilled in the art when the following description of examples of embodiments best contemplated for practicing the invention is read in conjunction with the accompanying drawing wherein like reference numerals refer to like or equivalent parts and in which.

DETAILED DESCRIPTION OF THE PREFERRED EMBODIMENTS

Figures 1, 2, 2A, 2B:
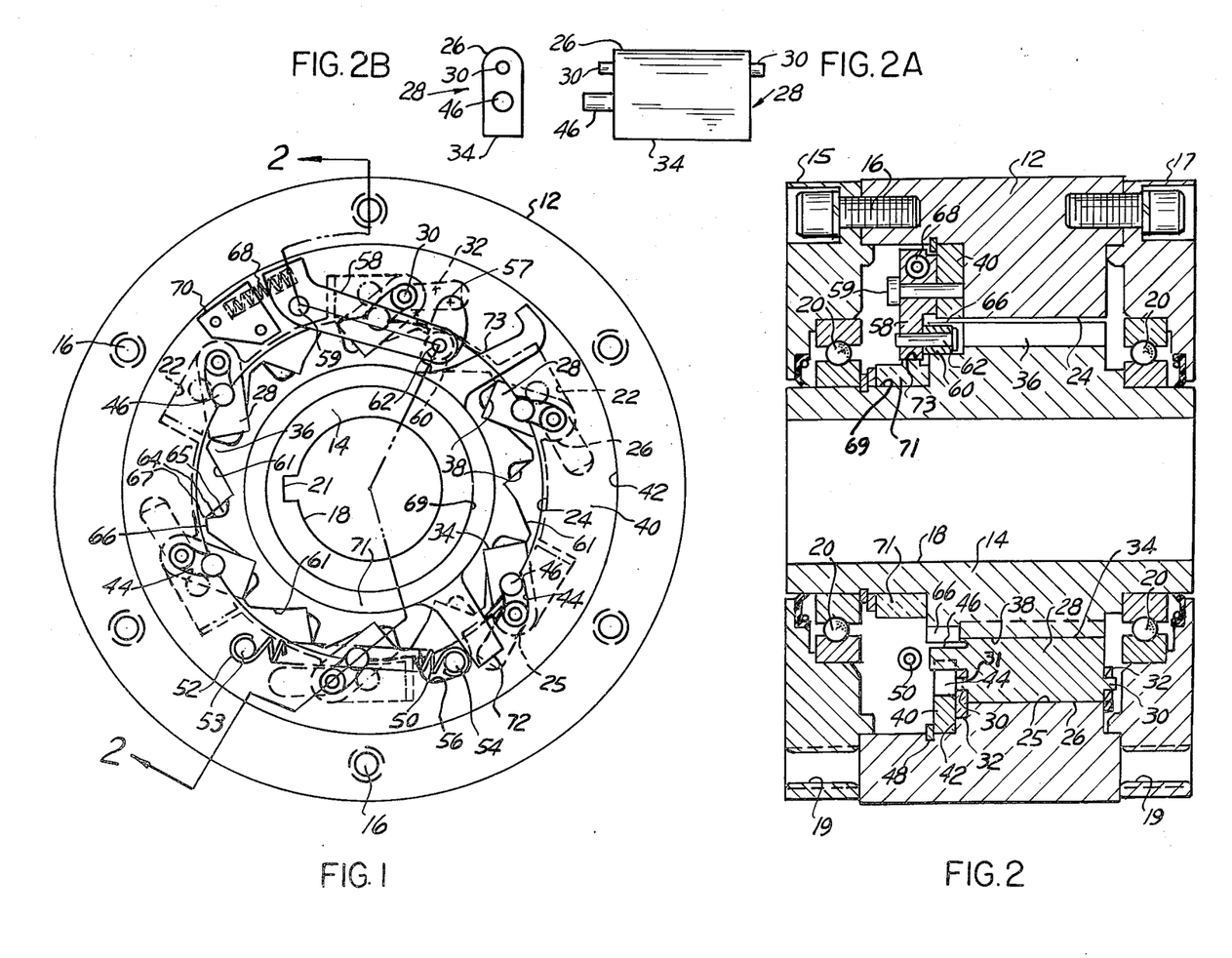
FIG. 1 is a side view of a positive one-way clutch according to the present invention with its face plates removed to show the internal construction.
FIG. 2 is a sectional view thereof substantially along line 2—2 of FIG. 1 with the face plates in position.
FIG. 2A is an elevation view of a typical torque bar.
FIG. 2B is an end view thereof.

Referring now to the drawing and more particularly to FIGS. 1-2 thereof, an example of positive one-way clutch according to the present invention comprises an outer race 12 and an inner race 14 disposed spaced apart coaxially and concentrically. The outer race 12 is provided with a plurality of circularly disposed mounting holes 16 for bolting thereto a front and rear face plates 15 and 17 respectively, FIG. 2, which are provided with a plurality of tapped holes 19 for fastening for example, to a coupling, not shown, an output shaft, or other application mechanism. Each of the front and rear faces plates 15 and 17 carries a ball bearing 20 providing the relative axial and concentric location of the inner and outer race members 12 and 14 respectively. The inner race 14 is provided with a concentric bore 18 and a keyway 21 for mounting on, for example, an output shaft.

The outer race 12 has a plurality of pockets 22 formed in its inner rim 24, six such pockets 22 being illustrated. Each pocket 22 has a partially cylindrical wall surface 25, six such partially cylindrical wall surfaces 25 being shown equally spaced along the rim 24 of the outer race 12, each accepting the half-cylindrical end 26 of a transfer member such as a torque bar member 28, shown in detail at FIGS. 2A-2B. Each torque bar member 28 has an integral pin 30 projecting on both sides, substantially at the center of the radius of the partially cylindrical end surface 26 through a hole 31 in a keeper plate 32 affixed to the outer race 12, such a locating arrangement providing only a means for loosely retaining the torque bar member 28 relative to the partially cylindrical wall surface 25, the load carrying function of each torque bar being obtained entirely by way of the partially cylindrical end 26 of the torque bar members 28 engaging the partially cylindrical wall surface 25 of the pockets 22.

The inner race 14 has a plurality of equally spaced tooth-like projections or positive clutch teeth 36, 12 in number in the example illustrated, each provided on one side with an accurately machined seat surface 38 for engagement with the seat end 34 of each of the torque bar members 28 when swung, as will be explained hereinafter, from their retracted position in the pockets 22 to their extended position shown in full lines at FIG. 1.

A positioning ring 40 is movably located in a shouldered annular recess 42 in a side face of the outer race 12, the positioning ring 40 being provided with positioning slots 44, each corresponding to one of the torque bar members 28, and into which projects a positioning pin 46 pressed into, or integrally formed in, the side of each torque bar member 28. A retainer ring 48, FIG. 2, holds the positioning ring 40 for free movement in the shouldered recess 42, and it is readily apparent that when the positioning ring 40 is rotated counterclockwise relative to the outer race 12 the camming action of the positioning slots 44 causes the torque bar members 28 to be retracted within the pockets 22, while clockwise relative motion of the positioning ring 40 causes the torque bar members 28 to extend in the angular position illustrated in full lines at FIG. 1 whereby the seat end faces 34 of each torque bar member 28 abuts the seat surface 38 of every alternate positive clutch teeth 36 on the inner race 14. In the first, or retracted position of the torque bar members 28, the outer race 12 and the inner race 14 are free to rotate independently of each other. In the second position of the torque bar members 28, or extended position, clockwise rotation of the inner race 14, for example is positively transmitted to the outer race 12, while counterclockwise rotation of the inner race 14 relative to the outer race 12 tends to separate the seat end face 34 of the torque bar members 28 from the seat surface 38.

The positioning ring 40 is constantly biased in a counterclockwise direction relative to the outer race 12 by means of a coiled spring 50 having an end 52 attached to the positioning ring 40 by a pin 53, fastened to the positioning ring 40, the other end of the spring 50 being attached to a pin 54 projecting from the bottom of the shouldered annular recess 42 on the side of the outer race 12 through a slot 56 in the positioning ring 40. The slot 56 is of a length sufficient to accomodate the extremes of rotation of the positioning ring 40 relative to the outer race 12. In this manner, the spring 50 exerts a pull on the positioning ring 40 in the direction that causes the torque bar member 28, through the intermediary of the camming action of the positioning slots 44 acting upon the torque bar member pins 46, to be retracted within the pockets 22.

A position actuating arm 58 is pivotally supported by a pivot pin 59 affixed to the positioning ring 40, and is provided on an end with a roller 60 (see also FIG. 2)

rotatably mounted on a stub shaft 62. The roller 60 projects into the side surfaces of the clutch teeth members 36 such as to be engageable by the substantially radial surface 64 of a pocket 65 formed in a positioning tooth 66. A spring 68 held by a spring keeper 70 fixed to the ring 40 constantly urges the end of the position actuating arm 58 carrying the roller 60 in the inward direction towards the positioning teeth 66.

Each positioning tooth 66 has an inclined side 61 which, by engaging the roller 60, causes the end of the lever 58 carrying the roller 60 to be displaced outward, against the pressure exerted by the spring 68, until the roller rolls over the tip 67 of each positioning tooth 66 and drops on the other side of the next positioning tooth 66 only part of the way towards the radiused pocket 65, as long as the inner race 14 rotates counterclockwise relative to the outer race 12. A cut-out portion 57 in the positioning ring 40 provides clearance for the free outward movement of the roller 60. However, as soon as the inner race 14 rotates clockwise relative to the outer race 12, the roller 60 is caught by the tip 67 or the substantially radial surface 64 of one of the positioning teeth 66 and is drawn inwardly into the pocket 65, thus causing the positioning ring 40 to be also displaced against the pull of the spring 50, with the result that the torque bar member pins 46 are caused to ride in the positioning slots 44 in the positioning ring 40, thereby swinging the torque bar members 28 to their extended position to engage their seat end face 34 with the seat surface 38 of the inner race positive clutch teeth 36. In order to properly engage the roller 60, a tangent to the radial surface 64 of the positioning teeth 66 forms an inward angle of less than 90° with a line extending through the center of the roller 60 and the pivot pin 59 of the actuating arm 58.

There is very little drag caused by the roller 60 riding along the inclined surface 61 of the positioning teeth 66 of the inner race 14 when the inner race 14 and the outer race 12 are operating in a free-wheeling or over-running mode, requiring that a relatively small spring pressure be exerted by the spring 68. Engagement between the inner and outer race is almost instantaneous as soon as the roller 60 engages the radial surface 64 of the positioning teeth 66. However, because of the positioning teeth 66 being disposed 30° away from each other in the example of structure illustrated, the backlash prior to driving engagement is minimum, the few degrees of required rotation by the positioning ring 40 for extending the torque bar members 28 amounting to a maximum of 30°.

It will be readily apparent that as soon as the inner race 14 is caused to rotate counterclockwise relative to the outer race 12 or the outer race 12 is caused to rotate clockwise relative to the inner race 14, the roller 60 becomes disengaged from the radial surface 64, and the positioning ring 40 is rotated by the contracting coil spring 50 in a counterclockwise direction relative to the outer race 12, thus causing, by the mutual action of the positioning cam slots 44 and pins 46, all the torque bar members 28 in unison to be retracted into the pockets 22.

It will also be readily apparent to those skilled in the art that either the inner race 14 or the outer race 12 may be the driving or driven member. Also, if one of the races is fixed in a stationary position the other race is capable of rotating only in one direction. It is also readily apparent that the direction of rotation in positive clutched engagement and free-wheeling or over-running respectively can be reversed by simply rotating the whole assembly 180° around an axis of symmetry in the plane of FIG. 1.

It is further readily apparent that although the example of structure illustrated and described is provided with six torque bar members 28 and 12 positive clutch teeth 36 and positioning teeth 66, any number of torque bar members, clutch teeth and positioning teeth may be used from one to any number depending upon the size required, the space available, the minimum angular rotation required from neutral to full positive engagement, and other engineering considerations.

The positioning teeth 66 may be made integral with the positive clutch teeth 36, as shown, or the positioning teeth 66 may be formed on a separate ring affixed to one side of the positive clutch teeth ring.

A simple free-wheel mechanism is also shown at FIGS. 1–2 whose function it is to automatically disengage the roller 60 of the positioning arm 58 from any contact whatsoever with the positioning teeth 66, when the race member acting as the driver member starts to run in its freewheel or over-run direction of rotation. For that purpose, a bearing friction ring 71 is rotatably mounted and axially located on the concentrically cylindrically finished surface portion 69 of the inner race member 14. The ring 71 is provided with a substantially radially extending arm 72 having a side engaging spring pin 54 for limiting the relative rotation of the ring 71 in one direction. The ring 71 is further provided with an outwardly projecting cam surface 73 engageable with the end of the positioning arm 58 supporting the cam roller 60.

A counterclockwise direction of rotation of the outer race member 12 relative to the inner race member 14 or, alternatively, a clockwise direction of rotation of the inner race member 14 relative to the outer race member 12 causes the positioning arm 58 to be displaced away from the cam surface 73 due to the slight bearing friction between the inner surface of the ring 71 and the cylindrical surface 69 on the inner race member 14, with the result that the hereinbefore explained positioning and positive clutching operations proceed without any disturbance caused by the action of the ring 71.

When the outer race 12 rotates clockwise relative to the inner race 14 the end of the positioning arm 58 carrying the roller 60 meets the cam surface 73 of the bearing friction ring 71 which, as a result of its relative slight friction with the surface 69 of the inner race member 14 is retardedly held back such that the positioning arm 58 is displaced outwardly by the camming surface 73 causing in turn the roller 60 to be moved away from any contact with the positioning teeth 66. Therefore, during free-wheeling or during over-run relative rotation of the race members, the slight bearing friction between the inner surface of the ring 71 and the inner race surface 69 causes the ring 71 to remain stationary relative to the outer race 12 and the cam surface 73 of the ring 71 meets the end of the positioning arm 58, thus slidingly camming it outward with the roller 60 out of any contact with the positioning teeth 66.

Figure 3:
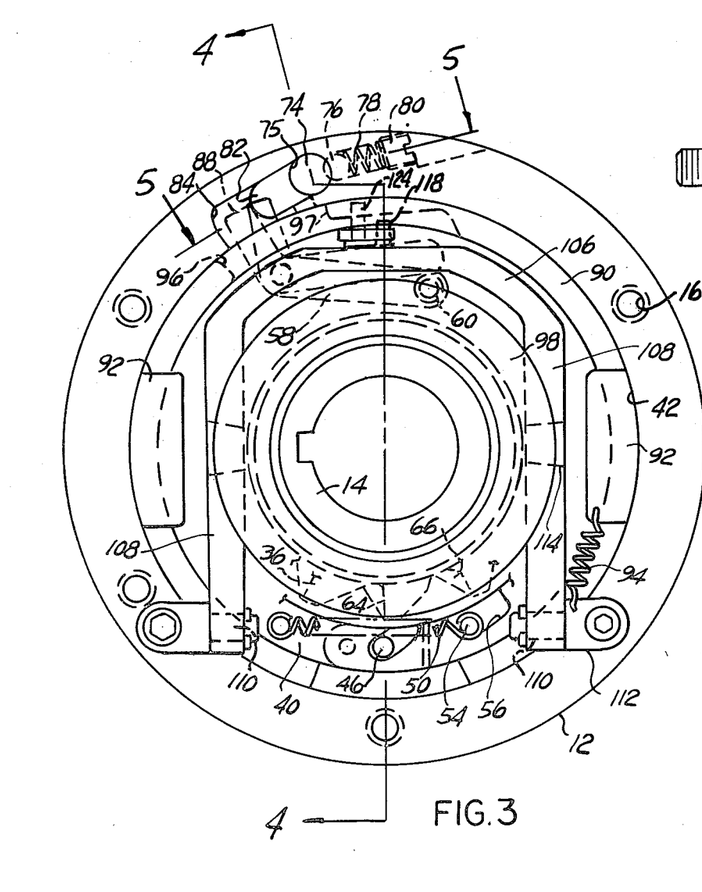
FIG. 3 is a side elevation view of a positive one-way clutch according to the present invention showing a modification of actuating mechanism, with face plates removed.
Figure 4:
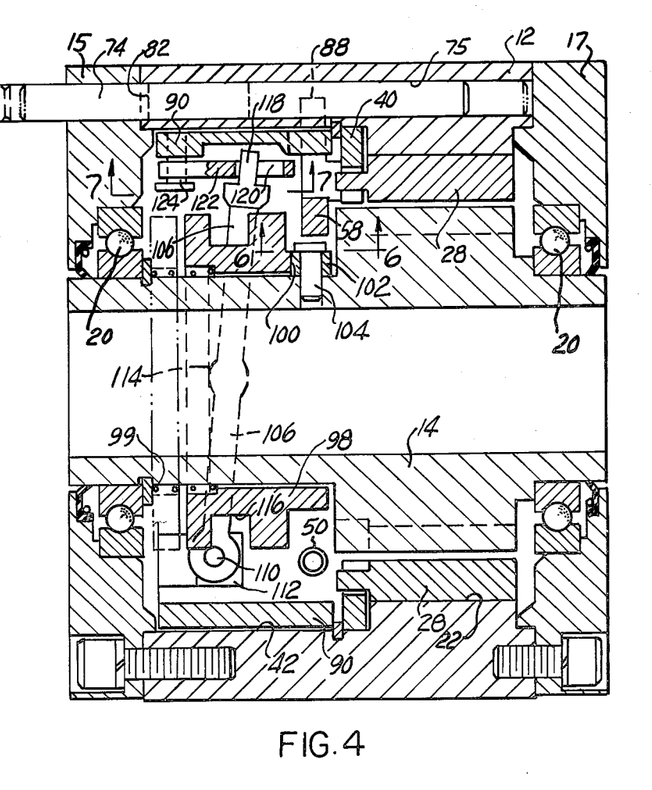
FIG. 4 is a sectional view along line 4—4 of FIG. 3, with face plates in position.

The embodiment illustrated at FIGS. 3–4 is in all respects alike the embodiment of FIGS. 1–2, with the exception of illustrating a modification of the control means for providing free-wheeling or over-run, and additionally showing a selective switch-off device for selectively de-activating the positive one-way clutch when desired, with the result that the outer and inner races are enabled to run absolutely free from each other in both relative directional rotations.

Figure 5:
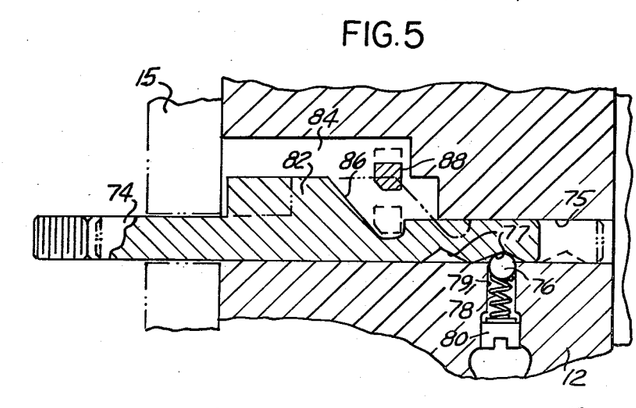
FIG. 5 is a partial sectional view substantially along line 5—5 of FIG. 4.

As illustrated at FIGS. 3–5, a "switch-off" control shaft 74 is disposed slidable in a transverse bore 75 formed proximate the periphery of the outer race 12. The control shaft 74 projects through the front face plate 15, for example. The control shaft 74 is actuatable from a fully pushed in position, shown in phantom lines at FIGS. 4–5, to the fully outward position shown in full lines, and is held in each position by means of a spring loaded ball 76 engaging one of two corresponding ball detent recesses 77 on the peripheral surface of the shaft 74, FIG. 5. The ball 76 is biased by a coil spring 78 disposed in a threaded hole 79 in the outer race 12, a set screw 80 permitting to adjust the amount of compression of the spring 78. The shaft 74 is provided with a sideway projecting lobe 82. A pocket 84 is formed in the outer race 12 to accomodate the sideway projecting lobe 82. The sideway projecting lobe 82 has an inclined camming ramp 86 projecting above a radially projecting arm 88 fastened to, or integral with, the actuating arm 58, when the switch-off control shaft 74 is pulled outward, as shown in solid lines. In this position of the control shaft 74, the actuating arm 58, and consequently the automatic positioning for the positive clutching operation, may operate as hereinbefore explained with respect to the arrangement of FIGS. 1–2. However, when the switch-off control shaft 74 is selectively pushed in, its camming ramp 86 engages the projecting arm 88 and pushes it away. The actuating arm 58 and the roller 60 are thus pushed in the direction that causes the roller 60 to no longer touch the positioning teeth 66 on the periphery of the inner race 12, with the result that no positioning and clutching operation can be effected in either direction of rotation and that the races run free of each other in both directions, without any drag or noise.

FIGS. 3–4 further illustrate an inertia operated automatic free-free-wheel or free-over-run arrangement comprising an inertia ring 90 mounted loosely and substantially frictionless in the extended shouldered annular recess 42 of the outer race 12, and provided with diametrically opposed added mass or weights 92, if so desired, to increase the inertia mass of the ring 90. A spring 94 may be disposed between the inertia ring 90 and the outer ring 12. A recess 96 is formed on the inside of the inertia ring 90 proximate the positioning arm 58 and the radially projecting arm 88 of the positioning arm 58 is disposed in the recess 96.

If it is assumed that the outer race 12 is the driving member, when it is suddenly accelerated in a clockwise direction the interia ring 90 tends to retain its position, such that the right side of the recess 96, as seen in the drawing, provides an abutment 97 engaging the arm 88, and thus holds the positioning arm 58 in an outward direction preventing the roller 60 from engaging the positioning teeth 66 for providing free and contactless free-wheel or over-run relative rotation of the outer and inner races 12 and 14.

Figure 6:
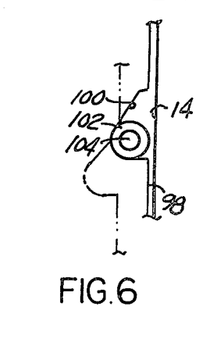
FIG. 6 is a partial sectional view substantially along line 6—6 of FIG. 4.

An inner inertia ring 98 is also illustrated at FIGS. 3–4 as being mounted loosely and substantially frictionless on the periphery of the inner race 14. The inertia ring 98, as shown at FIGS. 4 and 6, has a ramp slot 100 formed at a portion of its edge engaged by a roller 102 mounted by a bolt or pin 104 to the inner race 14, as best shown in the detailed fractional view of FIG. 6. Consequently, rotational motion of the inner inertia ring 98 causes lateral displacement of the inertia ring 98 against the force exerted by a coil spring 99 as a result of the action of the roller 102 upon the ramp 100.

A U-shaped transfer arm 106 has two parallel legs 108, the ends of which are pivotably mounted, as shown at 110, on the end of support brackets 112 fastened to the outer race 12. Each leg 108 of the transfer arm 106 is provided with an enlarged portion 114 engaged in an annular groove 116 (FIG. 4) in the inner inertia ring 98. Consequently, any lateral displacement of the inertia ring 98 causes the transfer arm 106 to swing about its pivot points 110.

Figure 7:
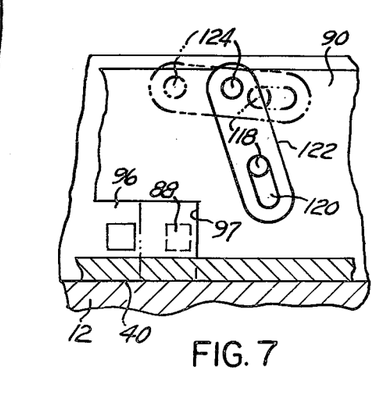
FIG. 7 is a partial sectional view along line 7—7 of FIG. 4.

The free end of the transfer arm 106 is provided with a pin 118 projecting in a slot 120 formed in the end of a transfer link 122 pivotally mounted, as shown at 124, on the inside of the outer inertia ring 90, FIGS. 4 and 7.

The operation of the transfer arm 106 is as follows. Assuming that the inner race 14 is the driving member, at the beginning of a cycle of operation all the torque bar members 28 are retracted in the pockets 22 in the outer race 12. When the inner race 14 begins to rotate counterclockwise, the inner inertia ring 98 tends to remain stationary and is therefore displaced laterally as a result of the ramp 100 riding over the roller 102. Consequently, the free end of the transfer arm 106 is caused to swing upwardly, as seen in FIG. 4. Therefore, as a result of the pin 118 engaged in the slot 120 of the transfer link 122, the transfer link 122 is displaced upwardly, as seen at FIG. 4. Because the transfer link 122 is disposed at an angle (FIG. 7) relative to the lateral axis of the outer inertia ring 90, the swinging action of the transfer arm 106 and of its end pin 118 causes the transfer link 122 to swing from the position in full line at FIG. 7 to the position in phantom line, thereby causing the outer inertia ring 90 to rotate counterclockwise, thus displacing the extended arm 88 of the actuating arm 58 with its roller 60 out of any contact from the positioning teeth 66 for free and contactless free-wheel or over-run rotations.

As soon as the inner race 14 stops its free-wheeling counterclockwise rotation, the inner inertia ring 98 is returned to its initial lateral position by the coil spring 99, thereby returning the transfer arm 106 also to its original position. Through the action of the transfer link 122, the outer inertia ring 90 is also returned to its original position, thus freeing the control arm 58, to return the system to its normal operation.

If the outer race 12 is the driving member, the free-wheeling operation hereinbefore explained remains the same, and remains undisturbed by the inner inertia ring because the outer inertia ring 90 is free to rotate without causing any motion of the transfer arm 106, in view of the extra space provided in the elongated slot 120 in which is disposed the transfer arm pin 118.

In the event that the outer race 12 and the inner race 14 are rotating in the same direction with speeds of rotation close to each other, the actions of the inner and outer inertia rings 98 and 90 cancel each other, because of their opposite equal inertia value, therefore leaving the engaging mechanism able to operate freely.

Figure 8:
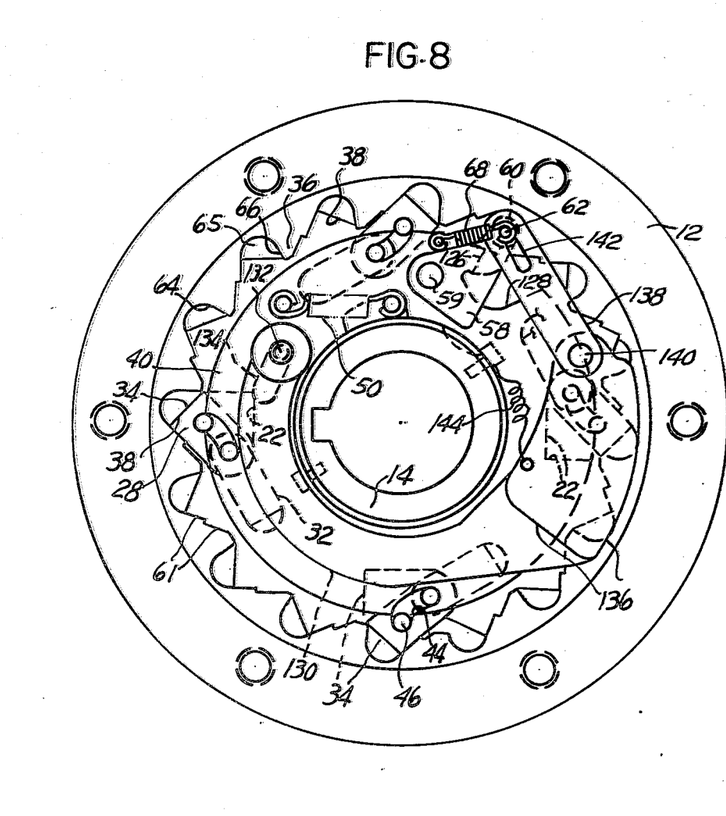
FIG. 8 is an elevation view of a further modification of the invention, with face plates removed.

Referring now to FIG. 8, a modification of the invention is illustrated wherein the relative arrangement of elements is reversed as compared to the precedently herein described embodiments. In the structure of FIG. 8, the inner race 14 is provided with pockets 22, four in number, each swingably accepting a torque bar member 28. The outer ring 12 is provided with a plurality of positive clutch teeth 36, sixteen in number, disposed at 22.5° apart in the example illustrated. Each clutch teeth member 36 has an engagement seat surface 38 for the seat end face 34 of the torque bar members 28 when in their extended engaged position. A positioning ring 40 is loosely fitted in the inner race 14 such as to be rotatable relative to the inner race. The positioning ring 40 has positioning slots 44, one for each torque bar member 28, through which projects the positioning pin 46 of the torque bar members 28. Consequently, the torque bar members 28 are retracted into the pockets 22 and extended as a result of the limited rotation of the positioning ring 40 relative to the inner race 14. A spring 50 normally pulls the positioning ring 40 in a clockwise direction relative to the inner race 14, thus retracting the torque bar members 28. Counterclockwise arcuate motion of the positioning ring 40 relative to the inner race 14 causes extension of the torque bar members 28, as shown in solid lines.

The inner race 14 and the outer race 12 are concentric and held relative to each other by means of ball bearings, or the like, not shown, as precedently described.

The positioning arm 58 is pivotally attached, as shown at 59, to the positioning ring 40. The roller 60 is mounted on the end of the positioning arm 58, and a spring 68, mounted between the end of the positioning arm 58 carrying the roller 60 and the positioning ring 40, urges the roller 60 in engagement with the radiused pockets 65 formed in the edge of the positive clutch teeth 36 forming the positioning teeth 66. It is readily apparent that when the roller 60 engages the positioning teeth 66, the positioning arm 58 is pushed against a shoulder 126 of a recess 128 in the positioning ring 40 with the outer race 12 rotating in a counterclockwise direction relative to the inner race 14, the positioning ring 40 is in turn urged counterclockwise, with the result that the positioning pins 46 of the torque bar members 28 are urged outwardly by the positioning ring positioning slots 44, thus causing the torque bar members 28 to swing out of the pockets 22 for engagement of their seat end 34 with the seat surface 38. Conversely, when the outer race 12 rotates clockwise relative to the inner race 14, the roller 60 rides, against the pull of the spring 68, on the inclined side 61 and ove the tip of the positioning teeth 66. The positioning ring 40 is urged clockwise relative to the inner race 14 under the action of the spring 50, with the result that the torque bar members 28 are retracted in their pockets 22.

A horseshoe-shaped centrifugal switch arm 130 is pivotally attached at one end to the inner race 14 by means of a pivot pin 132 projecting through a slot 134 in the positioning ring 40. The free end of the centrifugal switch arm 130 is provided with an enlarged mass forming a weight 136, and a link 138 is supported by means of a pivot pin 140 on the end of the centrifugal switch arm 130 provided with the weight 136. The other end of the link 138 has a slot 142 through which projects the pin 62 holding the roller 60 on the end of the positioning arm 58. A spring 144 has an end attached to the centrifugal switch arm 130 and another end mounted on the inner race 14, such as to exert a pull on the end of the centrifugal switch arm 130.

In the arrangement of FIG. 8, the inner race 14 is the driving member if the centrifugal switch free-freewheel advantage is desired. When the inner race 14 starts to rotate clockwise, the roller 60 on the end of the positioning lever 58 engages a substantially radial surface 64 of one positioning tooth 66 in the outer race 12, thus swinging the positioning arm 58 upwardly as seen at FIG. 8. The positioning arm 58 has a longitudinally directed projecting portion which is thus caused to engage the shoulder 126 in the sidewall of a cut-out aperture 128 in the positioning ring 40, thus rotating the positioning ring 40 counterclockwise relative to the inner race 14, and thus in turn causing the torque bar members 28 to extend such that their abutting seat end faces 34 engage the seat surfaces 35 of the positive clutch teeth 36 in the outer race 12. The outer race 12 is therefore driven by the inner race 14.

As soon as the outer race 12 over-runs the inner race 14, or starts rotating counterclockwise, the roller 60 on the end of the positioning arm 58 is freed and the spring 50 causes an opposite rotation of the positioning ring 40 relative to the inner race 14, with the result that the torque bar members 28 are retracted in their pockets 22.

When the inner race 14 starts its free-wheeling counterclockwise direction of rotation and reaches a predetermined speed of rotation depending on the tension exerted by the spring 144 on the centrifugal switch arm 130 against the mass of the arm and the weight 136, the centrifugal switch arm end carrying the weight 136 is swung outwardly, thus pulling on the link 138, which in turn pulls on the end of the positioning arm 58. Therefore, as a result of the positioning arm 58 swinging downwardly, as seen at FIG. 8, the roller 60 is pulled radially inwardly, namely away from the positioning teeth 66 on the outer race 12, with the result that there is no contact between the positioning teeth and the roller 60. As soon as the inner race 14 ceases to rotate at a designed velocity, the centrifugal switch arm 130 is returned to its original position, and does not interfere anymore with the normal function of the positioning arm 58.

Figure 9:
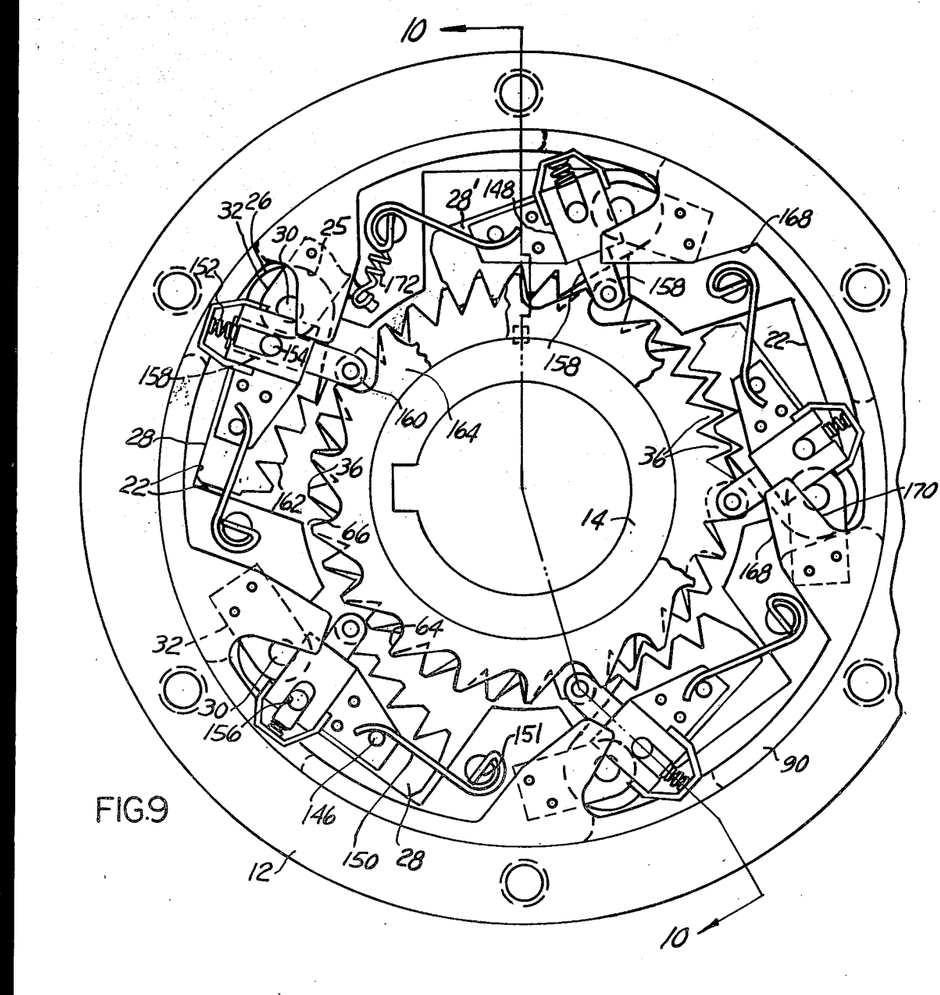
FIG. 9 is an elevation view of a further modification of the invention with face plates removed.
Figure 10:
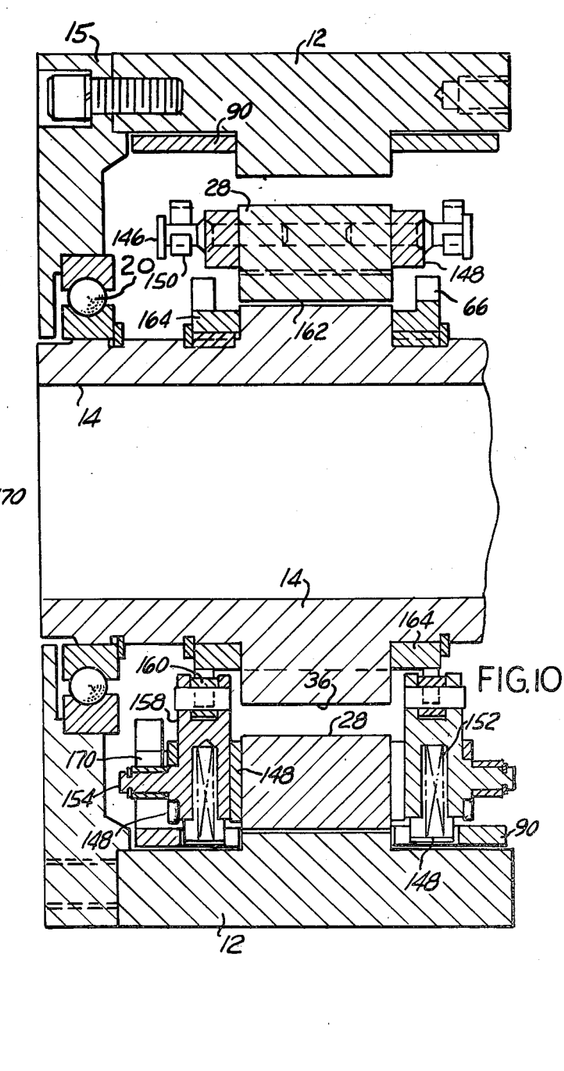
FIG. 10 is a sectional view substantially along line 10—10 of FIG. 9.

In the example of structure according to the present invention illustrated at FIGS. 9–10, the outer race 12 is provided with five pockets 22 having partially cylindrical end wall surfaces 25 evenly spaced at 72° from each other. A torque bar member 28 having a partially cylindrical end 26 is swingably disposed in each pocket 22, substantially as previously described, so as to be either fully retracted in the pocket 22, or angularly extended for engagement with the inner race 14. The torque bar members 28 are held in the pockets by way of keeper plates 32 having a locating hole loosely accepting a transverse pin 30 affixed to or integral with the torque bar members 28 and projecting on each side thereof. Each torque bar member 28 carries a pin 146 engaged with an end of a hair spring 150 supported on its other end by a slotted pin 151. The hair spring 150 is prestressed such as to tend to hold the torque bar member 28 in the pockets 22.

Each torque bar member 28 is individually provided with a positioning mechanism consisting of a positioning arm 158 slidably disposed in a housing 148 fastened to the torque bar member 28. The positioning arm 158 is normally biased toward the inner race 14 by a spring 152. The amount of displacement of the positioning arm 158 towards the inner race 14 is limited by a pin 154 fastened to or integral with the positioning arm 158 and abutting at the end of the slot 156 in the housing 148. In the example illustrated at FIGS. 9-10 a pair of positioning arms 158 are thus mounted one on each side of each torque bar member 28. The end of each positioning arm 158 carries a roller 160.

Each torque bar member 28 has a series of teeth 162 formed on its face which is towards the inner race 14, and capable of engaging the positive clutch teeth 36 peripherally disposed on the inner race 14. In the example illustrated, there are 36 such positive clutch teeth 10° apart from each other, and each provided on both sides with a substantially radial surface 64 forming a positioning tooth 66, in the same manner as previously explained. Such positioning teeth 66 may be formed integrally or they may be in separate rings, as shown at 164, at FIG. 10, affixed to the inner race 14 on each side of the clutch teeth 36 by any convenient means such as press-fitting and locating key. As illustrated, there are 18 such positioning teeth 66, spaced 20° apart, and the two side rings 164 are arcuately staggered 10° apart, such that the positioning teeth 66 on alternate sides of the tooth-like projections or clutch teeth 36 are 10° apart.

At rest all the torque bar members 28 are urged in the pockets 22 by the springs 150. The positioning arms 158 are pushed inwardly by the springs 152 with some of the rollers 160 partially engaged in the pockets of the positioning teeth 66. Assuming that the outer race 12 is the driving member, as soon as it starts rotation in a counterclockwise direction, some of the rollers 160 are caught by the substantially radial surface 64 of the positioning teeth 66. This causes the corresponding positioning arm 158 to be swung about its pivot point 30 swinging the torque bar member 28 inwardly out of the pocket to the position causing the teeth 162 of the torque bar member to engage the abutting surfaces of the clutch teeth 36 on the inner race 14. Such fully engaged position is illustrated with respect to the torque bar member 28' at the top of FIG. 9. The inner race 14 is thus driven by the outer race 12. Other positioning arms 28 remain partly open in the order of 2° increments.

As soon as the outer race 12 stops or starts to rotate oppositely, the engaged torque bar member 28' becomes disengaged, in the same manner as previously explained, and is returned to its retracted position by the spring 150.

It is readily apparent that in this arrangement engagement in the positive clutching position between the inner and outer race is effected in the order of every 2° instead of the 30° steps of the embodiment shown in FIGS. 1–2.

It is also readily apparent that diverse arrangements of diverse numbers of torque bars and/or positive clutch teeth and positioning teeth may be effected within the scope of the invention such that more than one torque bar member is engaged in the clutching/driving mode which provides any required small steps of positive clutch drive engagements.

An inertia ring 90 is disposed on each side of the outer race 12, for substantially frictionless free rotation relative to the outer race 12, in the same manner as previously explained with respect to the other embodiments of the invention. The inertia ring 90 is provided with generally radially inwardly extending projections 168, five in number, each provided with a camming ramp 170. A spring 172 tends to pull slightly the inertia ring 90 in a clockwise direction, as seen in FIG. 9. When the outer race 12 is suddenly accelerated in a clockwise direction, the inertia of the inertia ring 90 causes the ramps 170 to engage the projecting roller of the pins 154 projecting on the side of the positioning arm 158, out of any contact by its rollers 160 with the positioning teeth 66, and the operation in an automatic free free-wheeling condition is noiseless and frictionless.

It can be seen that the "free free-wheeling" devices shown hereinbefore with variations of embodiments of positive one-way clutches, can be used with other embodiments, such as the frictional disk type shown at FIGS. 1–2, and can be used with the embodiments of FIG. 8 or FIGS. 9–10. Furthermore it can be seen that the "switch-off" arrangement as shown at FIGS. 3–5 or its variation can be used with other embodiments also.

It can thus be seen that the present invention provides a positive one-way clutch system providing positive drive engagement between a driving and a driven member, without relying on frictional effect, by means of solid sturdy torque bar members made of any convenient material, such as hardened steel and the like, which work in compression along the axis of symmetry of the torque bar members and which, in their "free free-wheeling" or "free over-running" mode when the driving member is rotating in an opposite direction or the driven member over-runs the driving member, avoid any contact between the rotating members such that the functioning of the positive one-way clutch of the present invention is noiseless, frictionless, does not generate heat, and is positively engaged with very little contra-rotation. In view of the sturdiness of the torque bar or positive interconnecting members, the positive one-way clutches of the present invention permit to transmit a relatively high torque with a relatively light weight of structure.

Having thus described the present invention by way of examples of structure thereof, modifications whereof will be readily apparent to those skilled in the art, what is claimed as new is as follows:

1. A positive one-way drive mechanism comprising a first rotatable member, a second rotatable member co-axially disposed relative to said first rotatable member, a transfer member movably supported by one of said rotatable members and disposed between said first and second rotatable members, an abutment seat in each of said rotatable members, a pair of abutment faces on said transfer member each for engagement with one of said abutment seats, positioning means for moving said transfer member from a driving engagement position whereby said abutment faces each engages one of said abutment seats to a non-driving disengagement position whereby at least one of said abutment faces is disengaged from one of said abutment seats, and means for actuating said positioning means as a function of the relative rotation of said first and second rotatable members whereby said transfer member is in driving engagement for driving one of said rotatable members by the other in one direction of rotation only and said transfer member is in non-driving disengagement when the relative rotation of said first and second rotatable members is reversed, wherein said positioning means comprises a movable positioning ring carried by said rotatable member movably supporting said transfer member, means on said positioning ring for moving said transfer member into said driving engagement and for retracting said transfer member into said non-driving disengagement, spring bias means urging said positioning ring for moving said transfer member to said non-driving disengagement, an actuating arm for said positioning ring, at least one one-way actuator element carried by the other of said rotatable members, an actuator member on said arm engageable with said one-way actuator element, and spring bias means urging said actuator member toward said actuator element for engagement therewith for actuating said positioning ring for moving said transfer member into said driving engagement for one direction of relative rotation of said rotatable members, said actuator member and said one-way actuator element being disengaged during opposite direction of relative rotation.

2. The positive one-way drive mechanism of claim 1 further comprising a rotation responsive disengaging member carried by at least one of said rotatable members, said rotation responsive disengaging member disengaging said positioning means from said means for actuating said positioning means during said opposite direction of relative rotation of said rotatable members.

3. The positive one-way drive mechanism of claim 1 further comprising selective control means carried by one of said rotatable members, said selective control means having two positions, one of which is for locking said positioning means from said means for actuating said positioning means and the other for releasing said positioning means to its normal operation.

4. A positive one-way drive mechanism comprising a first rotatable member, a second rotatable member coaxially disposed relative to said first rotatable member, a transfer member movably supported by one of said rotatable members and disposed between said first and second rotatable members, an abutment seat in each of said rotatable members, a pair of abutment faces on said transfer member each for engagement with one of said abutment seats, positioning means for moving said transfer member from a driving engagement position whereby said abutment faces each engages one of said abutment seats to a non-driving disengagement position whereby at least one of said abutment faces is disengaged from one of said abutment seats, and means for actuating said positioning means as a function of the relative rotation of said first and second rotatable members whereby said transfer member is in driving engagement for driving one of said rotatable members by the other in one direction of rotation only and said transfer member is in non-driving disengagement when the relative rotation of said first and second rotatable members is reversed, wherein said positioning means comprises an actuating arm movably carried by said transfer member for moving said transfer member into said driving engagement and for retracting said transfer member to said non-driving engagement, spring bias means urging said transfer member to said non-driving engagement, at least one one-way actuator element carried by the other of said rotatable members, an actuator member on said arm engageable with said one-way actuator element, and spring bias means urging said actuator member toward said actuator element for engagement therewith for actuating said actuating arm for moving said transfer member into said driving engagement for one direction of relative rotation of said rotatable members and said one-way actuator element being disengaged during opposite direction of relative rotation.

5. A positive one-way clutch comprising an inner race member, a spaced apart outer race member disposed concentric to said inner race member, bearing means for maintaining said inner and outer race members in said concentric spaced apart relationship, at least one torque bar member pivotably disposed between said race members, a first abutment seat carried by one of said race members, a second abutment seat carried by the other of said race members and extending generally radially towards said first abutment seat, a first abutment face and a second abutment face on said torque bar member for engagement respectively with said first abutment seat and said second abutment seat when said torque bar member is angularly pivotally extended in the space between said race members, actuating means for pivoting said torque bar member to said extended position for driving one of said race members by the other in a single direction when the relative rotation of said race member is such as to decrease the distance between said abutment seats and for pivoting said torque bar member to a retracted disengaged position when the relative rotation of said race members is reversed, at least one tooth-like projection carried by the other of said race members and extending toward said race member supporting said torque bar member, and means operable by said tooth-like projection for controlling said actuating means, wherein said actuating means for pivoting said torque bar member to said extended and retracted positions comprises an actuating ring carried by and rotatable relative to said race member carrying said torque bar member, a camming slot in said ring, a pin dependent from said torque bar member and projecting through said camming slot, whereby when said ring is rotated in one direction relative to said race member said torque bar member is retracted and when said ring is rotated in an opposite direction said torque bar member is extended.

6. The positive one-way clutch of claim 5 wherein said means operable by said tooth-like projection comprises an actuating arm, said actuating arm having a fixed pivot point on said ring, a roller mounted on an end of said arm, spring bias means urging said roller carrying end of said arm in a direction towards said tooth-like projection, a recess formed on a side of said tooth-like projection and having a convexity directed such as to engage with said roller and thus rotate said ring in a direction extending said torque bar member for engagement of the abutment faces thereof with said abutment seats when said race members tend to rotate in opposite directions, and spring bias means urging said actuating ring in an opposite direction when said roller is disengaged from said curvilinear recess.

7. The positive one-way clutch of claim 5 further comprising rotational friction responsive means carried by at least one of said race members, and means on said friction responsive means for automatically disengaging said means operable by said tooth-like projection from said tooth-like projection when said race members are free-wheeling relative to each other.

8. The positive one-way clutch of claim 5 further comprising a rotational inertia responsive means carried by at least one of said race members, and means on said inertia responsive means for automatically disengaging said means operable by said tooth-like projection from said tooth-like projection when said race members are free-wheeling relative to each other.

9. The positive one-way clutch of claim 5 further comprising rotational centrifugal force responsive means carried by at least one of said race members and means operated by centrifugal force responsive means for automatically disengaging said means operable by said tooth-like projection from said tooth-like projection when said race members are free-wheeling relative to each other.

10. The positive one-way clutch of claim 5 further comprising a selective control means carried by at least one of said race members, said selective control means having at least two positions, one of which is for locking said means operable by said tooth-like projection from said tooth-like projection and the other is for releasing it to its normal operation.

11. The positive one-way clutch of claim 5 wherein said torque bar member is pivotally supported by one of said race members and has a circularly cylindrical end in engagement with a partially circularly cylindrical surface formed on said race member pivotally supporting said torque bar member defining respectively one of said abutment faces and one of said abutment seats.

12. The positive one-way clutch of claim 11 wherein the other of said abutment face of said torque bar member is a substantially planar end face thereof opposite to said circularly cylindrical end substantially in a plane perpendicular to the axis of symmetry of said torque bar member.

13. The positive one-way clutch of claim 11 wherein the other of said abutment faces of said torque bar member is one of a plurality of tooth-like projections formed on a side of said torque bar member and engageable with said abutment seat.

* * * * *